May 18, 1954

A. KOPPL 2,679,039

BOLT ACTION OPERATED ALARM SYSTEM AND SWITCHES THEREFOR

Filed Nov. 13, 1950

INVENTOR.
ADOLF KOPPL
BY
ATTORNEY.

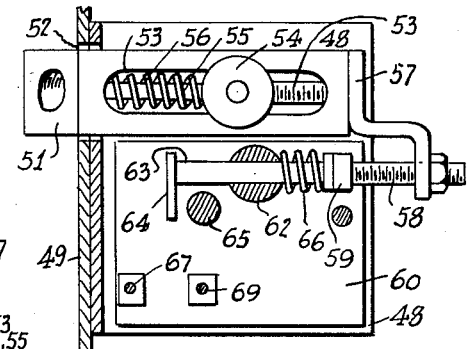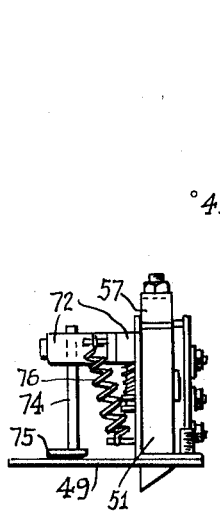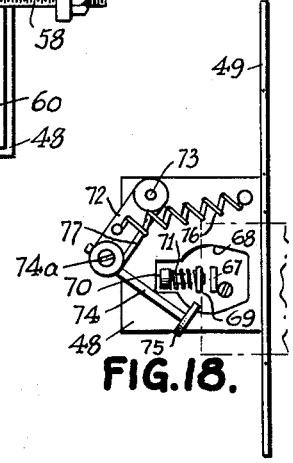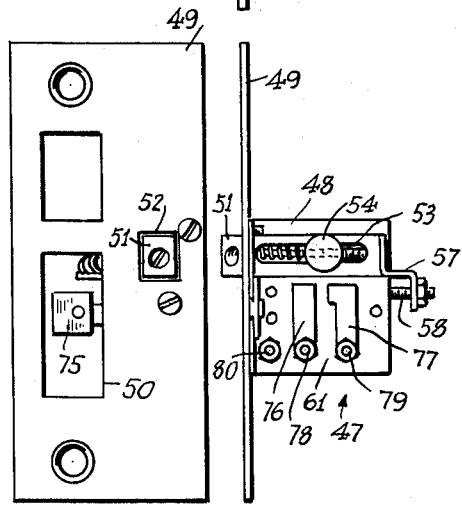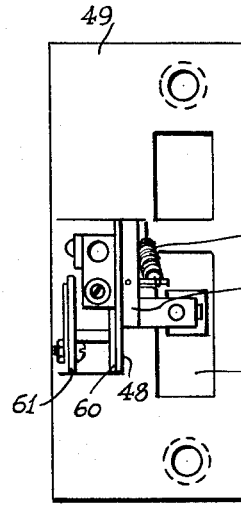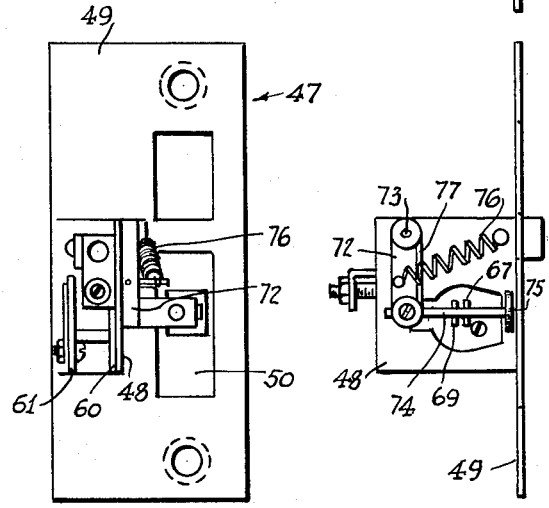

May 18, 1954          A. KOPPL          2,679,039
BOLT ACTION OPERATED ALARM SYSTEM AND SWITCHES THEREFOR
Filed Nov. 13, 1950          3 Sheets-Sheet 3
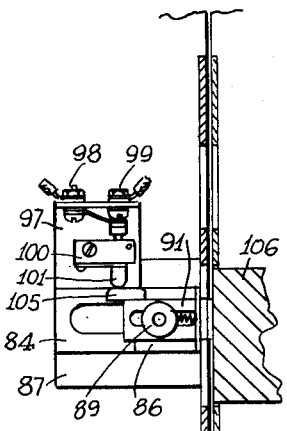
FIG. 25.
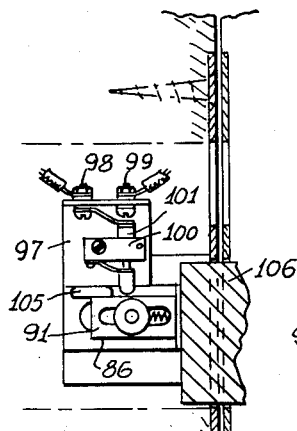
FIG. 26.
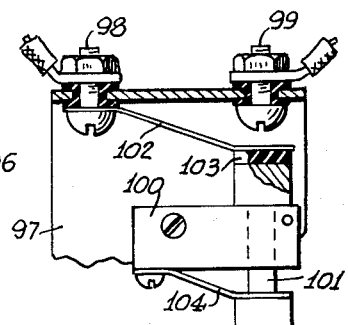
FIG. 27.
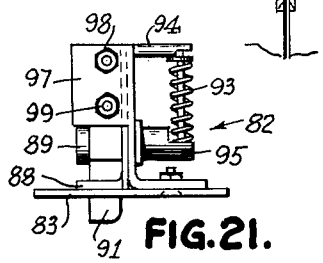
FIG. 21.
FIG. 24.
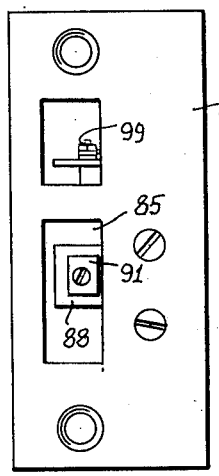
FIG. 20.
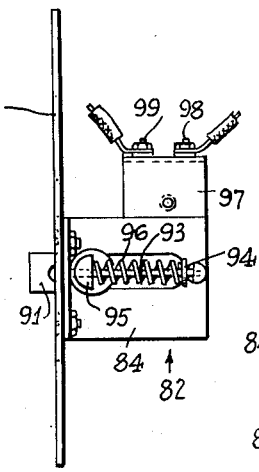
FIG. 22.
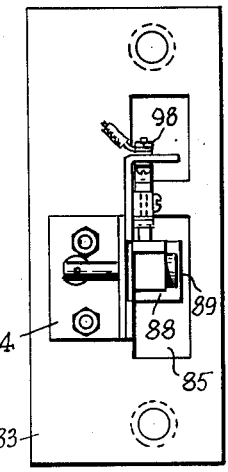
FIG. 23.
INVENTOR.
ADOLF KOPPL.
BY
ATTORNEY.

Patented May 18, 1954

2,679,039

UNITED STATES PATENT OFFICE 2,679,039

BOLT ACTION OPERATED ALARM SYSTEM AND SWITCHES THEREFOR

Adolf Koppl, New York, N. Y.

Application November 13, 1950, Serial No. 195,384

3 Claims. (Cl. 340—282)

The present invention relates to alarm systems, and particularly to an alarm system and switches therefor to be installed on or associated with the frames of entrance doors, windows, drawers and the like, and operated by the bolt action of locks associated therewith.

An object of the present invention is to provide an alarm system and switches therefor which operate to sound or otherwise give an alarm or indication when the door or other closure with which it is associated is closed but not locked.

According to one aspect of the invention another object resides in the provision of an alarm system for a space having a closure which includes a first normally open switch positioned and constructed to be closed when the associated closure is closed, and a second normally closed switch connected in series with the first switch and positioned and constructed to be opened by the bolt of the lock when the latter is manipulated to its locked position so that an alarm circuit in which the first and second switches are interposed will be completed only when the closure is closed and its lock is not in locked condition.

According to another aspect of the invention another object of the present invention is to provide an alarm system of the character indicated wherein the required switches are constructed and arranged to be embodied in a single assembly for easy installation in the frame of the door, or other closure, for example the drawer of a filing cabinet or the like.

According to still another aspect of the present invention, it is an object to provide a single switch constructed to be normally open, to be closed when the associated closure is closed and to be opened when the lock on such closure is manipulated to locked position.

A further object is to provide an alarm system of the character indicated wherein the required switches are constructed so as to be substantially tamper-proof.

A still further object is to provide an alarm system of the described character and operating as set forth, wherein the required switches are simple and inexpensive to manufacture, easy to install and positive in their operation.

The above objects, as well as other and further objects, features and advantages of the present invention will be manifest in the following detailed description of preferred embodiments thereof when read in connection with the accompanying drawings which form a part hereof.

In the drawings:

Fig. 12 is an inside elevational view of a combined switch device as mounted on the strike plate of a lock and constructed according to another embodiment of the present invention;

Fig. 13 is a top plan view of the combined switch of Fig. 12;

Fig. 14 is a front elevational view of the combined switch of Fig. 12;

Fig. 15 is a view similar to Fig. 14, but with the combined switch shown in its condition when the associated door is closed and the lock thereof is disengaged;

Fig. 16 is an outside elevational view of the combined switch of Fig. 12;

Fig. 17 is a rear elevational view of the combined switch of Fig. 12, with the associated door open;

Fig. 18 is a view similar to that of Fig. 17 but with the parts thereof in the positions assumed when the associated door is closed and the bolt of its lock is engaged;

Fig. 19 is a front elevational view similar to that of Fig. 14, but with the foremost insulating plate removed to show the details of construction of one of the switches of the combined assembly;

Fig. 20 is a front elevational view of a switch device as mounted on the strike plate of a lock and constructed according to still another embodiment of the present invention;

Fig. 21 is a top plan view of the switch device of Fig. 20;

Fig. 22 is a side elevational view of the outer side of the switch device of Fig. 20;

Fig. 23 is a rear elevational view of the switch device of Fig. 20;

Fig. 24 is a side elevational view of the inner side of the switch device of Fig. 20;

Fig. 25 is a side elevational view similar to Fig. 24, but with the switch device shown in the position assumed when the closure with which it is associated is closed;

Fig. 26 is a side elevational view similar to Fig. 25, but with the switch device shown in the position assumed when bolt of the lock on the associated closure enters the related opening of the strike plate; and Fig. 27 is a detail side elevation, on an enlarged scale, showing the construction of the contacts of the switch device in the position of Fig. 26.

Figure 2:
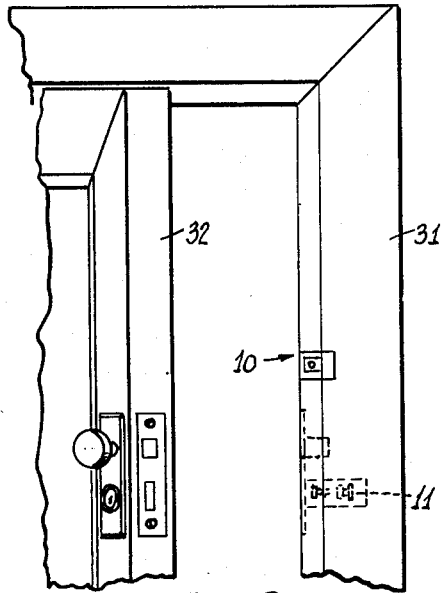
Fig. 2 is a perspective view of a door frame and a door, which is shown ajar, and illustrating the manner in which the switches of the alarm system are arranged on the frame for operation by the door and the bolt of the lock thereof.

Referring to the drawings in detail, and initially to Figs. 1-11 thereof, an alarm system, and the switches forming parts thereof according to one embodiment of the invention are there illustrated as associated with an entrance door. However, it is to be understood that the various devices hereinafter described are equally useful in connection with any closure, for example, windows, filing or other cabinets and the like, having a bolt action type lock. The system which is diagrammatically shown in Fig. 1 includes a normally open switch 10 and a normally closed switch 11 which are connected in series along with an alarm light 12 and an alarm buzzer 13. Power is supplied to this series circuit by one of the windings of a transformer 14, while the other winding of the transformer may be energized by connection thereof to an available source of electricity through the plug 15. The normally open switch 10 is constructed and arranged, as will hereinafter be specifically set forth, so that it is closed by the door, with which the alarm system is associated, when such door is closed and will be open when the door is ajar as in Fig. 2. The normally closed switch 11 is constructed and arranged, in a manner to be specifically set forth, so that the switch is unaffected by the opening or closing of the door, and so that the switch is only opened when the lock is manipulated to its locked position for projecting the bolt thereof through the associated strike plate. Thus, it can be seen that the circuit shown in Fig. 1 will be completed or closed only when both switches 10 and 11 are simultaneously closed, that is, when the door is closed and the lock thereon is in engaged or locked position. A three-way switch S is preferably interposed in the conductor connecting the switch 10 to the signal light 12, and includes the contact terminals $a$, $b$ and $c$. The terminal $a$ is connected to one side of the switch 10, the terminal $b$ is connected by a conductor 9 to the circuit at the other side of the switch 10, and the terminal $c$ is insulated and constitutes an "off" position for the circuit. Thus, when the throw of switch S is moved to engage the contact $b$ (Fig. 1), the switch 10 is by-passed and the alarm devices will be continuously energized until the lock of the associated closure is manipulated to closed position to open the switch 11. When the throw of switch S is moved to engage the contact $a$ thereof, then both of switches 10 and 11 are in the circuit and the operation thereof is as set forth above. Finally, when the throw of switch S is moved onto the insulated post or contact $c$, the circuit is permanently open and the alarms remain deenergized without regard to the actuation of the switches 10 and 11.

Referring specifically to Figs. 3-7, the details of construction of the switch 10 are there shown. Switch 10 includes a plate 16 having a rearwardly opening cutout 17 (Fig. 4) formed therein and a right angled flange 18 extending along its forward edge. An insulating plate 19, formed of Bakelite or any other similar material, is secured as by rivets to the plate 16 at the side of the latter opposite to the direction in which flange 18 extends. A first terminal post 20 extends from the insulating plate 19 adjacent the forward edge of the latter and is formed with a through bore within which a plunger 21 is slidably carried. A head 22 is formed on the forward end of plunger 21 and a coil spring 23 is interposed between head 22 and terminal post 20 for urging the plunger forwardly. A cross-pin 24 is fixed to the plunger 21 in back of post 20 and limits the forward movement of the plunger. A movable contact member 25 is slidable on the rear portion of plunger 21, which is upset at its rear end to prevent removal of the contact member therefrom, and a coil spring 26 (Figs. 6 and 7) is interposed between cross-pin 24 and contact member 25 to constantly urge the latter against the upset rear end of the plunger. A fixed contact member 27 is formed by a metallic strip extending from the insulating plate in back of the movable contact 25 and into the path of travel of the latter. The fixed contact 27 is formed with a suitably shaped and positioned opening 28 through which the upset rear end of plunger 21 may project, so that, when the plunger is moved rearwardly, the movable contact 25 first contacts the fixed contact 27, and the plunger may continue such rearward movement after the contacts have been engaged without bending or otherwise damaging the structure. Terminal screws 29 and 30 (Figs. 4 and 6) extend from the insulating plate 19 within the cutout 17 and are electrically connected to the terminal post 20 and the fixed contact 27.

The switch 10 is shown mounted on a door jamb 31 (Fig. 2) with the head 22 of the plunger extending forwardly and into the path of travel of the edge portion of the door 32. When the door 32 is open, the spring 23 maintains the movable contact 25 spaced from the fixed contact 27, but, when the door is closed, the plunger is moved rearwardly to effect the closing of the switch.

Figures 8, 9, 10:
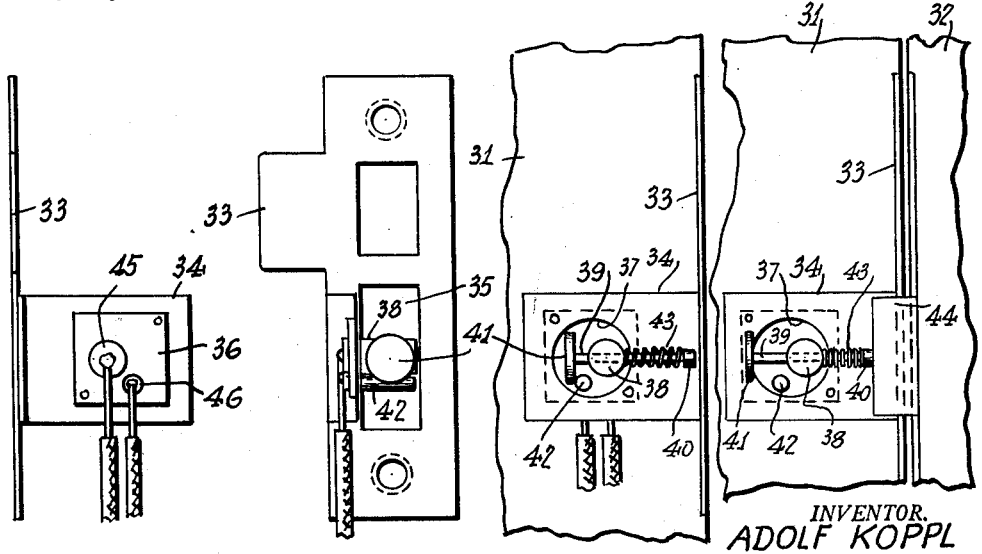
Fig. 8 is a front elevational view of another switch attached to the strike plate of a lock as used in connection with the switch of Figs. 3–7 in one embodiment of the invention.
Fig. 9 is a side elevational view of the switch shown in Fig. 8.
Fig. 10 is a rear elevational view of the switch shown in Fig. 8, with the switch being illustrated in its position when the door lock is open or disengaged.

Referring now to Figs. 8-11, the details of construction of the switch 11 are there illustrated with such switch being mounted upon a strike plate 33 of a bolt action type lock assembly. The switch 11 includes a plate 34 flanged at the front and secured to the strike plate 33 at one side edge of the opening 35 formed in the latter to receive the bolt of the lock. An insulating plate 36 is secured to the plate 34 and an opening 37 is formed in the latter (Figs. 10 and 11) in the area of such insulating plate. A post 38 extends from insulating plate 36 through opening 37 and is formed with a through bore within which a plunger 39 is slidable. A head 40 is formed on the end of plunger 39 facing the bolt receiving opening 35 while a movable contact member 41 is fixed on the other end of the plunger. A fixed contact 42 extends from the insulating plate 36 and through the opening 37 to a position ahead and in the path of travel of the movable contact 41. A spring 43 (Figs. 10 and 11) is interposed between the post 38 and the head 40 to constantly urge the plunger toward the bolt receiving opening 35 so that the movable contact 41 engages the fixed contact 42 (Fig. 10).

When the door 32 is closed and the lock thereon is manipulated to project the bolt 44 through the opening 35 of the strike plate, such bolt 44 engages the head 40 of the plunger and pushes the latter before it to separate the contacts 41 and 42 and thus open the switch 11. Terminals 45 and 46 are provided on the insulated plate 34 and electrically connected to the post 38 and fixed contact 42, respectively, so that suitable conducting wires may be attached for connecting the switch 11 in series with the switch 10 and with the signal light 12, warning or alarm buzzer 13 and power transformer 14.

From the above it can be seen that the switch 11 is normally closed while the switch 10 is normally open, and that closing of the door 32 effects closing of the switch 10 to actuate the various alarms or signals, which alarms can only be inactivated by locking the door so that the bolt 44 effects the opening of switch 11.

Figures 1, 6:
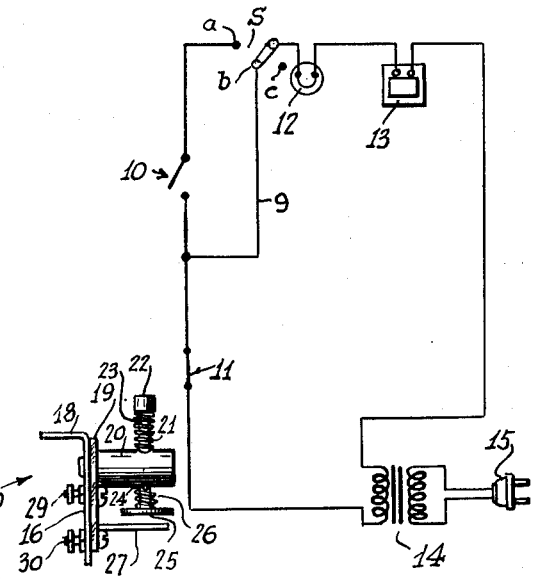
Fig. 1 is a wiring diagram of an alarm system embodying the present invention.
Fig. 6 is a top elevational view of the switch shown in Fig. 3.
Figure 3:
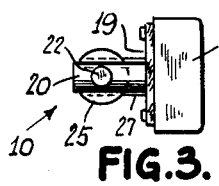
Fig. 3 is a front elevational view of a switch utilized in the alarm system according to one embodiment of the invention.
Figure 4:
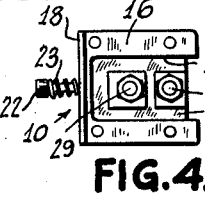
Fig. 4 is a side elevational view of the switch shown in Fig. 3.
Figures 5, 7, 11:
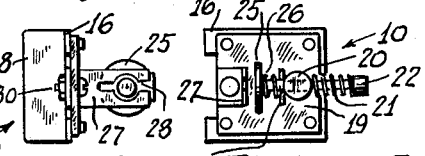
Fig. 5 is a rear elevational view of the switch shown in Fig. 3.
Fig. 7 is a side elevational view of the switch shown in Fig. 3, but looking at such switch from the side opposed to that shown in Fig. 4.
Fig. 11 is a view similar to Fig. 10, but showing the condition of the switch when the door lock is closed or engaged.

Referring now to Figs. 12–19, a device 47 is shown constructed according to another embodiment of the present invention, and wherein the two switches utilized in the alarm system illustrated diagramatically in Fig. 1 are incorporated into a single unitary structure. The device 47 includes a mounting plate 48 flanged along its outer edge and secured to a strike plate 49 along one side edge of an opening 50 formed in the latter to receive the bolt of a lock carried by the associated door. A plunger or bolt 51 is slidably carried by the plate 48 adjacent the top edge of the latter and at the side thereof remote from the opening 50. The bolt 51 is bevelled at one end for projection through an opening 52 (Fig. 12) formed in strike plate 49, and is formed with a longitudinal slot 53 (Figs. 14 and 15) receiving a pin 54 extending from plate 48 for mounting the bolt on the mounting plate. A shaft 55 carried at its opposite ends by the bolt 51 and extending along the slot 53 and slidably through the pin 54 carries a spring 56 between the pin and the end of the slot adjacent the bevelled end of the bolt so that the latter is continuously urged to a projecting position (Fig. 14). The shaft 55 is formed with a threaded enlarged portion engaging against the post 54 to limit the projecting movement of the bolt 51. The threaded portion of shaft 55 threadedly engages in the end portion of bolt 51 so that the projecting position of the latter may be adjusted by rotation of the shaft. The end of the bolt 51 remote from the bevel supports a bracket 57 on which a switch actuator 58 is adjustably mounted. An insulating head 59 is fixed on the end of actuator 58 to operate the switch which is best seen in Fig. 19 and corresponds to the switch 10 of the first described embodiment. This switch is mounted between inner and outer spaced insulating plates 60 and 61, respectively, supported by the mounting plate 48 below the bolt 51, and includes a post 62 extending from the outer plate 61 and formed with a through bore slidably receiving a plunger 63 in axial alignment with the actuator 58. A movable contact member 64 is fixed to the end of plunger 63 remote from the actuator for engagement with a fixed contact member 65 also extending from the outer insulating plate 61 and into the path of travel of the movable contact. A spring 66 interposed between the post 62 and the headed end of plunger 63 adjacent the actuator constantly urges the plunger in the direction for bringing the movable and fixed contacts 64 and 65 into engagement. However, the spring 56 in the bolt 51 is stronger than the spring 66 and urges the head 59 of the actuator against the plunger 63 for moving the latter in the direction separating the contacts 64 and 65. Thus, the contacts 64 and 65 will be normally separated, however, when the associated door is closed the side edge thereof will ride against the bevelled end of the plunger 51 to move the latter (Fig. 15) so that the actuator 58 is spaced from the plunger 63 and spring 66 is free to engage the movable contact 64 with the fixed contact 65.

The other switch in the device 47, corresponding to the switch 11 of the first described embodiment, includes a fixed contact 67 (Fig. 18) carried by the inner insulating plate 60 and extending through an opening 68 formed in the mounting plate 48. A conducting carrier 69 for a movable contact extends from insulating plate 60 next to the fixed contact 67 and slidably carries a movable contact 70, in the form of a plunger which is urged away from the fixed contact 67 by a spring 71. The plunger 70 is actuated by an arm 72 pivoted at its upper end on a pin 73 carried by the plate 48 and adjustably supporting an operating rod 74 at its lower or free end by a screw 74a. A head 75 is fixed on the rod 74 for engagement by the bolt of the lock carried by the associated door when such bolt is projected into the opening 50 of the strike plate. A spring 76 is connected at its opposite ends to plate 48 and to arm 72 for constantly urging the latter in the direction for moving the head 75 towards the strike plate 49. An insulating strip 77 is secured to the edge of arm 72 facing the plunger 70 and when the arm 72 is in the position of Fig. 17 (when the lock is unlocked) strip 77 engages the plunger 70 to move it into contact with the fixed contact 67. Since spring 76 is substantially stronger than spring 71, the latter is normally restrained from acting and the contacts 70 and 67 are normally engaged. Thus, the second switch is normally closed and is only opened when the bolt of the lock enters the strike plate and engages the head 75 for displacing the arm 72. As seen in Fig. 19, the fixed contact 67 and the conducting post 69 for the movable contact 70 extend through the insulating plate 60 into the space between the plates 60 and 61.

At the outer surface of insulating plate 61, conducting strips 76 and 77 are provided (Figs. 14 and 15) and are electrically connected to the fixed contact 65 and to the posts 62 and 69, respectively. Terminals 78 and 79 extend from the strips 76 and 77, respectively, and a third terminal 80 is connected electrically to the fixed contact 67 so that the two switches are permanently connected in series and may be interposed in the series circuit constituting the remainder of the alarm system by attaching suitable conductors to the terminals 78 and 80.

Referring now to Figs. 20–27 of the drawings, a switch device 82 is there shown constructed according to still another embodiment of the present invention and for use in association with a closure, for example, an entrance door, a cabinet or filing drawer, a window and the like, having a bolt action type lock assembly. The contacts of the switch device 82 are constructed and arranged to be normally open, to be closed when the associated closure is closed, and to be again opened by the bolt of the lock assembly when the latter is manipulated to a locked position, and the single switch device 82 thereby may replace the two switches of each of the previously described embodiments and is preferably connected in series with suitable alarm or signalling devices and a manually controlled "on-off" switch.

The switch device 82 is shown mounted on the strike-plate 83 of a bolt action type lock assembly and includes a mounting plate 84 formed with a flange along its forward edge for attachment to the strike plate at one side of an opening 85 formed in the latter to receive the bolt of the lock assembly. A carriage 86 (Fig. 24) is slidable on the inner face of the plate 84 above a guide 87 and includes a right angularly bent projection 88 (Fig. 20) at its forward end formed with a rectangular opening. A pin 89 extends from the carriage 86 to enter a slot 90 formed longitudinally in a bolt or plunger 91 for slidably mounting the latter on the carriage. The bolt 91 extends slidably through the rectangular opening in the bent projection 88, and a spring 92 is disposed in the slot 90 to bear against pin 89 for continuously urging the bolt 91 to a position extended from the carriage 86. The carriage 86 is continuously urged toward the strike plate 83 by a compression spring 93 (Fig. 22) positioned between a fixed abutment 94 at the outer side of plate 84 and a pin 95 extending from the carriage through a longitudinal slot 96 formed in plate 84. Thus, the carriage 86 and bolt 91, which is bevelled, extending beyond the strike plate and into the path of travel of the associated closure.

The contact assembly of the switch device 82, best seen in Fig. 27, is supported by a contact supporting plate 97 extending upwardly from the mounting plate 84. The top edge of plate 97 is flanged to overlie the path of travel of the carriage 86 and terminal screws 98 and 99 are supported on such flange and insulated from the latter. A guide block 100 is supported on the plate 97 and is formed with a vertical bore slidably receiving a plunger 101 which is formed with heads at its opposite ends. A resilient contact strip 102 is cantilevered on the terminal screw 98 and at its free end overlies the upper end of the plunger 101, which upper end is provided with an insulated tip 103. When the plunger 101 is moved upwardly (Fig. 25) the free end of contact strip 102 is displaced into contact with the other contact screw 99 to thereby close the switch. A cantilever spring 104, carried by the block 100, engages the plunger 101 and continuously urges the latter downwardly to a switch open position.

In order to actuate the plunger 101, an actuating block 105 is carried by the bolt 91 at its top surface and is formed with bevelled edges so that block 105 may ride smoothly under plunger 101 as the bolt 91 and carriage 86 are displaced in response to engagement by the closure and the bolt of the latter's lock assembly.

The operation of the switch device of Figs. 20–27 is as follows:

When the associated closure is open (Fig. 24), the bolt 91 is extended through the strike plate 83 and the actuating block 105 is disposed ahead of the plunger 101 so that the latter may drop under the influence of spring 104 to separate contact strip 102 from the terminal screw 99. Under these conditions the switch is open.

When the associated closure is closed (Fig. 25), with the bolt 106 of the lock assembly withdrawn, the bolt 106 engages the bevelled end of bolt 91 and moves the latter rearwardly to slide the actuating block 105 under the plunger 101 thereby lifting the latter and moving the contact strip 102 against terminal screw 99. The switch is then closed.

Finally, when the lock assembly is manipulated to locked position (Fig. 26) extending the bolt 106 into the opening 85 of the strike plate, the bolt 106 pushes the carriage 86 before it and the actuating block 105 is moved to the rear of the plunger 101 so that the latter may return to its lowered position for separating the contact strip 102 from the terminal screw 99.

Thus, the switch device 82, when installed in an electric circuit in series with alarm devices, will effect the energization of the latter only when the associated closure is closed and the lock thereof is in unlocked condition thereby achieving the same results and objectives as are accomplished with the double switches of the previously described embodiments.

While I have described and illustrated preferred embodiments of the invention, it is to be understood that I do not wish to be limited to these precise embodiments, as obviously many changes and modifications may be effected therein without departing from the scope or spirit of the invention which is intended to be defined by the appended claims.

What I claim is:

1. In a warning system for premises including a closure having a bolt action type lock assembly and electrically energized alarm means; said system comprising a normally open switch mounted to be closed by the closure when the latter is closed, a normally closed switch mounted to be opened by the bolt of the lock assembly when the latter is manipulated to locked position, a source of electric power, and conducting means electrically connecting said normally closed switch, said normally open switch with said alarm means in series and across said source so that said alarm means is energized only when the closure is closed and the lock assembly is unlocked and a selectively actuable switch connected in parallel with said normally open switch to energize said alarm means regardless of the position of said closure when said lock assembly is unlocked and said selectively actuable switch is closed.

2. In a warning system a closure fitting within a frame and having a bolt action type lock assembly and electrically energized alarm means; a switch means carried by said frame; said switch means including a slidable bolt normally spring urged into the path of travel of said closure and being positioned to register with the bolt of said lock assembly when said closure is in closed position within said frame, a fixed contact, a movable contact normally spaced from said fixed contact, and movable contact operating means displacing said movable contact against said fixed contact when said slidable bolt is displaced by said closure moving to its closed position, said operating means freeing said movable contact for separation from said fixed contact when said slidable bolt is further displaced by said bolt of said lock assembly as the latter is manipulated to locked position; a source of electric current; and conducting means electrically connecting the contacts of said switch means with said alarm means in series and across said source so that said alarm means are energized only when said closure is closed and said lock assembly is in unlocked condition.

3. The combination according to claim 2, wherein said operating means includes a movable plunger extending at right angles to the direction of movement of said slidable bolt, spring means constantly urging said plunger into the path of travel of said slidable bolt, an insulating tip on said plunger engageable with said movable contact, and an actuating member on said slidable bolt engaging said plunger when said slidable bolt is displaced by said closure moving to its closed position to thereby move said plunger against the force of said spring means for engaging said movable contact against said fixed contact.

References Cited in the file of this patent

UNITED STATES PATENTS

| Number | Name | Date |
|---|---|---|
| 429,817 | Shubert | June 10, 1890 |
| 528,589 | Brownell et al. | Nov. 6, 1894 |
| 742,073 | Schubert | Oct. 20, 1903 |
| 1,169,649 | Kafader et al. | Jan. 25, 1916 |
| 1,170,032 | Williams | Feb. 1, 1916 |
| 1,674,570 | Re | June 19, 1928 |
| 2,103,363 | Hansen | Dec. 28, 1937 |
| 2,286,463 | Chaskin | June 16, 1942 |